: 2,927,133
Patented Mar. 1, 1960

2,927,133
PREPARATION OF AMINE BORANES

Robert W. Bragdon, Marblehead, Mass., assignor to Metal Hydrides, Incorporated, Beverly, Mass., a corporation of Massachusetts No Drawing. Application August 13, 1957
Serial No. 677,843

7 Claims. (Cl. 260—583)

This invention relates to a method for the preparation of amine boranes.

The amine boranes are chemical adducts of organic amines and the borane group ($BH_3$). One method for their preparation is described by Brown, Schlesinger and Cardon in the Journal of the American Chemical Society, vol. 64, page 325, and comprises the direct addition of diborane to an amine as illustrated by the equation:

$$B_2H_6 + 2C_5H_5N \rightarrow 2C_5H_5NBH_3 \qquad (1)$$

Another method is described by Schaeffer and Anderson in the Journal of the American Chemical Society, vol. 71, page 2143, and comprises the reaction of an amine hydrochloride with an alkali metal borohydride in an ether solvent as illustrated by the equation:

$$(CH_3)_3NHCl + LiBH_4 \rightarrow (CH_3)_3NBH_3 + LiCl + H_2 \qquad (2)$$

A third method is described in the United States patent to Banus, Gibb and Bragdon No. 2,678,949 and involves the thermal decomposition of a quaternary ammonium borohydride as illustrated by the equation:

$$(CH_3)_4NBH_4 \rightarrow (CH_3)_3NBH_3 + CH_4 \qquad (3)$$

In accordance with the method of the present invention carbon dioxide, either as a gas or solid, is introduced into an amine to form the corresponding amine carbamate. When the amine is isopropylamine the reaction is illustrated by the equation:

$$CO_2 + 2C_3H_7NH_2 \rightarrow C_3H_7NHCOOC_3H_7NH_3 \qquad (4)$$

The isopropylamine carbamate then is reacted with a solution of an alkali metal borohydride, such as sodium, lithium or potassium. When sodium borohydride is used, it may be dissolved in isopropylamine and be reacted with the isopropylamine carbamate to form a reaction liquor consisting of isopropylamine, precipitated sodium isopropylamine carbamate and dissolved isopropylammonium borohydride as illustrated by the equation:

$$NaBH_4 + C_3H_7NHCOOC_3H_7NH_3 \rightarrow$$
$$C_3H_7NHCOONa + C_3H_7NH_3BH_4 \qquad (5)$$

The isopropylammonium borohydride is thermally unstable and may be decomposed thermally to form isopropylamine borane by refluxing the reaction liquor until hydrogen gas ceases to be evolved as illustrated by the equation:

$$C_3H_7NH_3BH_4 \rightarrow C_3H_7NH_2BH_3 + H_2 \qquad (6)$$

The refluxed liquor is filtered to remove the precipitated sodium compound and the resulting solution may be evaporated to obtain solid isopropylamine borane. The reaction liquor as illustrated by Equation 5 above may be obtained directly by introducing the carbon dioxide into a solution of sodium borohydride in isopropylamine, the isopropylammonium carbamate being formed in situ and reacted with the dissolved sodium borohydride.

In place of isoproylamine other liquid primary and secondary alkyl amines may be used and also the liquid primary and secondary alkenyl, cycloaliphatic and heterocyclic amines. Illustrative examples of such amines are ammonia, methylamine, ethylamine, isopropylamine, butylamine, propylamine, ethylene diamine, cyclohexylamine, morpholine, piperidine, pyrrolidine, propylene diamine, cyclopropylamine, cyclobutylamine, cyclopentylamine, etc.

When the amine used is a solvent for the alkali metal borohydride used it is preferred to use an excess of the amine to serve as the solvent for the alkali metal borohydride. However, when the amine used is not a solvent for the alkali metal borohydride used, a solution of the latter in an inert solvent for the borohydride may be used. For example, diisopropylamine is not a solvent for sodium borohydride. In the preparation of the borane of diisopropylamine using sodium borohydride, a solution of the latter in the dimethyl ether of diethylene glycol may be reacted with diisopropylammonium carbamate or carbon dioxide may be associated with a mixture of diisopropylamine and the solution of sodium borohydride in the dimethyl ether of diethylene glycol.

In general, therefore, the invention contemplates the preparation of an amine borane by (1) forming an amine carbamate by the reaction of carbon dioxide with a liquid amine selected from the primary and secondary alkyl, alkenyl, cycloaliphatic and heterocyclic amines, (2) reacting the amine carbamate with an alkali metal borohydride dissolved in a solvent therefor to form a reaction mixture comprising the solvent and an alkali metal amine carbamate together with an ammonium borohydride, and (3) thermally decomposing the ammonium borohydride to form an amine borane. The above reaction mixture may be formed directly by associating carbon dioxide with a liquor consisting of the amine and a solution of the alkali metal borohydride in which case the amine carbamate is formed in situ and reacted with the alkali metal borohydride.

The invention is illustrated further by the following specific examples.

Example 1

Isopropylammonium carbamate was prepared by the addition of solid Dry Ice to an excess of isopropylamine followed by the removal of the excess amine by vacuum evaporation. 17.1 grams of the isopropylammonium carbamate dissolved in 800 cc. of isopropylamine was added to 76.1 grams of a 5.83 percent sodium borohydride solution in isopropylamine in a one liter, round bottom, three-neck flask fitted with a stirrer, water-cooled condenser backed by a Dry-Ice-cooled condenser, and a separatory funnel. The addition took place at room temperature over the course of 30 minutes. No heat was generated and there was no evidence of gas evolution. A fine, white precipitate formed during the addition. On standing at room temperature, slow evolution of gas was noted. After standing for 66 hours, the reaction mixture was filtered through a medium porosity glass sinter disk. The clear filtrate was evaporated to dryness in vacuum. The residue weighed 7.4 grams, which is 96% of the theoretical yield. Following extraction with ether and recovery by vacuum evaporation, the product had a melting point of 61.5–62.0° C. and contained 14.4 percent boron and 19.6 percent nitrogen.

The above mentioned precipitate, after being vacuum dried, weighed 13.0 grams which is 98.5 percent of the theoretical yield. It was identified as $C_3H_7NHCOONa$ by analysis for sodium and nitrogen, the sodium content being 18.2 percent and the nitrogen content being 11.2 percent.

Example 2

4.2 grams of Dry Ice were added to a solution of 3.91 grams of 98.3 percent sodium borohydride in 600 cc. of isopropylamine in a one liter, round bottom, three-neck flask fitted with a cold water condenser backed by a Dry-Ice-cooled cold-finger condenser. An initially vigorous reaction resulted which soon subsided. A white precipitate was formed during this initial reaction. The reaction mixture was refluxed and hydrogen was evolved during a period of 15 to 20 minutes. The gas volume was measured by means of a wet-test meter. 19.5 liters of gas were evolved under the experimental conditions. 21.4 liters of hydrogen at standard temperature and pressure conditions is the theoretical amount for this reaction. The reaction mixture was filtered and the clear filtrate vacuum evaporated at room temperature. The solid residue obtained from the evaporation was dissolved in 200 cc. of diethyl ether and filtered. The filtrate was evaporated to dryness in vacuum. The solid product weighed 5.8 grams which is 83 percent of the theoretical yield. The melting point was 62.0–63.5° C.

The white precipitate from the reaction mixture was dried in vacuum for 16 hours and weighed 10.8 grams. It was identified as sodium isopropylamine carbamate by analysis. The analysis showed it contained 18.2 percent sodium, 11.1 percent nitrogen, 37.7 percent carbon and 6.47 percent hydrogen by weight.

Example 3

Technical morpholine was purified by distillation from sodium borohydride. Dry Ice was added to a portion of the amine until a precipitate formed. An excess of sodium borohydride was dissolved in a separate portion of the amine. The separate portions were filtered and the clear filtrates were combined. There resulted an evolution of gas and the formation of a precipitate. The reaction mixture was evaporated to dryness and the residue was extracted with ether. The ether solution was separated by filtration and evaporated to dryness. The product had a melting point of 82 to 85° C. and was very soluble in water and alcohol and moderately soluble in ether, benzene and hexane.

Example 4

Technical cyclohexylamine was purified by distillation from sodium borohydride. Dry Ice was added to a portion of the amine until a precipitate formed. An excess of sodium borohydride was dissolved in a separate portion of the amine. The separate portions were filtered and the clear filtrates combined. A precipitate formed and gas was evolved. The reaction mixture was evaporated to dryness and the residue was extracted with ether. The ether solution was separated by filtration and evaporated to dryness. The product had a melting point of 92–95° C. It was very soluble in alcohol, moderately soluble in ether and benzene and slightly soluble in water and hexane.

Example 5

About 6 grams of Dry Ice was added to a solution of 5 grams sodium borohydride in 6 grams of water and between 100 and 200 cc. of isopropylamine. The reaction was vigorous and considerable carbon dioxide was lost as vapor. A white precipitate formed. After the addition of the Dry Ice was complete, gas continued to evolve for a short period. The reaction mixture was filtered and the filtrate evaporated to dryness. The residue was extracted with ether. The filtered ether solution was evaporated to dryness to obtain about 2.5 grams of a white solid identified as isopropylamine borane by its melting point of 60°–61.5° C.

Example 6

A sample of sodium isopropylamine carbamate was added to a strong aqueous caustic solution in a test tube. The odor of isopropylamine was immediately evident. Moist litmus paper placed at the mouth of the test tube turned blue. This test indicates that isopropylamine can be recovered from the by-product, sodium isopropylamine carbamate, obtained in the preparation of isopropylamine borane.

I claim:

1. In the preparation of an amine borane, the step which comprises mixing an amine carbamate having a formula selected from the group consisting of:

$$[RR'NH_2]^+ [OOCNRR']^-$$
and
$$[R''NH_3]^+ [OOCNR'']^-$$

where R is a member of the group consisting of lower alkyl, lower alkenyl, lower cyclo-alkyl and R' is a member of the group consisting of hydrogen, lower alkyl, lower alkeny, lower cyclo-alkyl and R'' is a hetero-cyclic nucleus selected from the group consisting of morpholine, piperidine and pyrrolidine, with an alkali metal borohydride in an inert solvent for the alkali metal borohydride selected from the group consisting of the parent amine of said carbamate and dimethyl ether of ethylene glycol in the proportion of one mole of amine carbamate per mole of alkali metal borohydride at room temperature and atmospheric pressure thereby forming in said inert solvent an alkali metal amine carbamate corresponding to the parent amine together with the ammonium borohydride corresponding to the parent amine.

2. The method as claimed by claim 1 wherein the selected amine is a liquid primary lower alkyl amine.

3. The method as claimed by claim 2 wherein the alkali metal borohydride is sodium borohydride.

4. The method as claimed by claim 3 wherein the amine carbamate is isopropylamine carbamate.

5. The method as claimed by claim 1 wherein the alkali metal borohydride is sodium borohydride.

6. The method as claimed by claim 5 wherein the selected amine is morpholine.

7. The method as claimed by claim 5 wherein the selected amine is cyclohexylamine.

References Cited in the file of this patent

Lappert: Chem. Reviews, p. 1042, vol. 56, No. 5 (October 1956).